(12) United States Patent
Nishimura et al.

(10) Patent No.: US 12,504,150 B2
(45) Date of Patent: Dec. 23, 2025

(54) ILLUMINATION DEVICE

(71) Applicant: Mitsubishi Electric Corporation, Tokyo (JP)

(72) Inventors: Masatoshi Nishimura, Tokyo (JP); Satoru Okagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 55 days.

(21) Appl. No.: 18/682,441

(22) PCT Filed: Sep. 27, 2022

(86) PCT No.: PCT/JP2022/035953
§ 371 (c)(1),
(2) Date: Feb. 9, 2024

(87) PCT Pub. No.: WO2023/054364
PCT Pub. Date: Apr. 6, 2023

(65) Prior Publication Data
US 2025/0129913 A1    Apr. 24, 2025

(30) Foreign Application Priority Data
Sep. 29, 2021  (JP) .................. 2021-159790

(51) Int. Cl.
*F21V 9/02* (2018.01)
*F21V 3/06* (2018.01)
(Continued)

(52) U.S. Cl.
CPC ............ *F21V 9/02* (2013.01); *F21V 3/06* (2018.02); *F21V 9/40* (2018.02); *F21V 14/04* (2013.01)

(58) Field of Classification Search
CPC ........................................................ F21V 9/02
See application file for complete search history.

(56) References Cited

U.S. PATENT DOCUMENTS

2016/0273723 A1   9/2016  Van Gheluwe et al.
2016/0320023 A1   11/2016  Meerbeek et al.
(Continued)

FOREIGN PATENT DOCUMENTS

JP   2009-043629 A   2/2009
JP   2015-207554 A   11/2015
(Continued)

OTHER PUBLICATIONS

Extended European Search Report issued Dec. 12, 2024, in corresponding European Patent Application No. EP22876230.8, 6pp.
(Continued)

*Primary Examiner* — Sean P Gramling
(74) *Attorney, Agent, or Firm* — XSENSUS LLP

(57) ABSTRACT

Regarding an illumination device reproducing a sky seen through a window, an object is to achieve further size reduction and structure simplification and reproduce a more natural scene without limiting provision places and the number of provided devices. An illumination device of the present disclosure includes: a light source; a diffuser having a scattering structure to scatter entering light, and having at least one light entrance surface, a first light exit surface from which first outgoing light including scattered light produced by the scattering structure goes out, and a second light exit surface from which second outgoing light different from first outgoing light goes out; a sunshine formation portion provided at least at one position around the diffuser, and having a light-transmitting member; and a turning portion to guide second outgoing light toward the sunshine formation portion.

20 Claims, 12 Drawing Sheets

(51) Int. Cl.
*F21V 9/40* (2018.01)
*F21V 14/04* (2006.01)

(56) References Cited

U.S. PATENT DOCUMENTS

| | | |
|---|---|---|
| 2021/0190279 A1 | 6/2021 | Fujii et al. |
| 2022/0221130 A1 | 7/2022 | Okagaki et al. |

FOREIGN PATENT DOCUMENTS

| | | | | |
|---|---|---|---|---|
| JP | 2016-540349 A | 12/2016 | | |
| JP | 2018-170123 A | 11/2018 | | |
| JP | 2020-191308 A | 11/2020 | | |
| WO | 2015/055430 A1 | 4/2015 | | |
| WO | 2015/135560 A1 | 9/2015 | | |
| WO | WO-2019220656 A1 * | 11/2019 | ............ | F21S 10/023 |
| WO | 2020/240664 A1 | 12/2020 | | |

OTHER PUBLICATIONS

International Search Report issued on Nov. 29, 2022 in the International Application No. PCT/JP2022/035953 filed on Sep. 27, 2022, 10 pages including English Translation.

* cited by examiner

ILLUMINATION DEVICE

CROSS-REFERENCE TO RELATED APPLICATIONS

The present application is based on PCT filing PCT/JP2022/035953, filed Sep. 27, 2022, which claims priority from Japanese Patent Application No. 2021-159790, filed Sep. 29, 2021, the entire contents of each are incorporated herein by reference.

TECHNICAL FIELD

The present disclosure relates to an illumination device, and in particular, relates to an illumination device that simulates a natural scene such as a sky seen through a window.

BACKGROUND ART

There are illumination devices that simulate natural scenes such as a sky seen through a window (see, for example, Patent Documents 1 and 2). An illumination system described in Patent Document 1 includes one or a plurality of side walls defining a recess, and a light-transmitting/light-producing area located at the bottom of the recess. Further, in the illumination system, at least one of the side walls has a rectangular light emitting area formed of triangular light emitting areas which are independently controllable, and is provided with an illumination device for controlling the shape, contrast, intensity, or color of light provided at the side wall. With this structure, the illumination system simulates, on the side wall, a sunshine area and a shade area which, if the light-transmitting/light-producing area located at the bottom of the recess were an actual window, would be formed by sunlight (hereinafter, may be referred to as poured light) poured from the window.

An illumination system described in Patent Document 2 includes a light source and a lamp shade-like structure. The lamp shade-like structure includes a screen structure and a bottom body, and the bottom body has a diffused light generator serving as a Rayleigh diffuser. In the illumination system, the light source is arranged so as to irradiate the entire upper surface of the diffused light generator with a main light beam angle set at about 60 degrees. With this arrangement of the light source, it is possible to let a user recognize diffused light emitted from the diffused light generator as light simulating a blue sky, and also recognize a main light beam transmitted through the diffused light generator as direct light from the sun. With this structure, a user looking at the diffused light generator recognizes that the sun appears to be located on a far side across the diffused light generator simulating a window, in a pseudo manner.

CITATION LIST

Patent Document

Patent Document 1: WO2015/055430
Patent Document 2: Japanese Laid-Open Patent Publication No. 2015-207554

SUMMARY OF THE INVENTION

Problem to be Solved by the Invention

However, in the structure shown in Patent Document 1, light sources for different usages need to be provided for a light-emitting panel part (corresponding to the light-transmitting/light-producing area located at the bottom of the recess) simulating a sky seen through a window, and a side wall part forming the sunshine area and the shade area simulating poured light illuminating a window frame. Specifically, a light source for simulating a blue sky needs to be provided for the light-emitting panel part, and a light source simulating poured light needs to be provided for the side wall part. The color, the intensity, and the distribution of light desired to be viewed by a user are different between the light-emitting panel simulating a sky through the window and the side wall simulating poured light illuminating the window frame, and therefore light sources respectively suitable for them are to be provided. As described above, in a case where different light sources need to be provided at a plurality of parts of the illumination device, there are problems such as device size increase and structure complication due to a dissipation mechanism for heat generated from the light sources, wiring elements, and the like. In addition, increase in the number of light sources leads to increase in consumed energy, and therefore is not preferable in terms of energy saving, as well.

The structure shown in Patent Document 2 is such a structure that an emission surface of a light-emitting panel emits not only scattered light simulating a sky but also transmitted light simulating direct light of sunlight, so that an observer recognizes the scene as if he/she sees the sun through the light-emitting panel simulating the sky. Therefore, as seen from the observer, the sun is always located within the light-emitting panel (corresponding to the diffused light generator serving as a Rayleigh diffuser) simulating one window. Thus, in a case where a plurality of illumination devices are provided for simulating a plurality of windows such as a skylight one and a wall-mounted one on the indoor side, there is a problem that a natural scene cannot be reproduced. That is, the structure shown in Patent Document 2 is for letting the observer recognize the scene as if he/she sees the sun through the light-emitting panel simulating a sky, and therefore there is a problem that the provision places and the number of provided devices are limited.

In view of the above circumstances, an object of the present disclosure is to provide an illumination device that can achieve size reduction and structure simplification by sharing a common light source as a light source for simulating a sky seen through a window and a light source for simulating poured light illuminating a window frame, and can reproduce a natural scene without imposing a limitation on the provision places and the number of provided devices.

Means to Solve the Problem

An illumination device according to one aspect of the present disclosure includes: a light source; a diffuser having a scattering structure to scatter light that has entered the diffuser, and having at least one light entrance surface, a first light exit surface from which first outgoing light including scattered light produced by the scattering structure goes out, and a second light exit surface from which second outgoing light different from the first outgoing light goes out; a sunshine formation portion provided at least at one position around the diffuser, and having a light-transmitting member; and a turning portion to guide the second outgoing light toward the sunshine formation portion.

Effect of the Invention

With the present invention, an illumination device which reproduces a sky seen through a window can be configured to achieve further size reduction and structure simplification and reproduce a natural scene without imposing a limitation on provision places and the number of provided devices.

BRIEF DESCRIPTION OF THE DRAWINGS

FIG. 11 is

DESCRIPTION OF EMBODIMENTS

Figure 1:
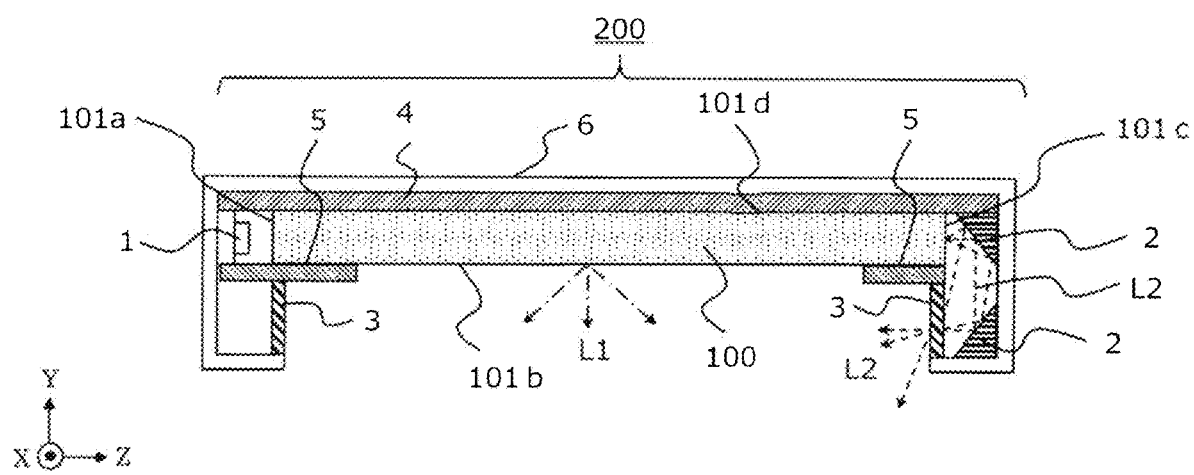
FIG. 1 is a sectional view showing a configuration example of an illumination device 200 according to embodiment 1.

Hereinafter, embodiments of the present disclosure will be described with reference to the drawings. The following embodiments are merely examples. The embodiments may be combined as appropriate and may be variously modified within the scope of technical features described in the present disclosure. In the drawings, a constituent part may be shown in different dimension scales. In the following embodiments, for facilitating description, coordinate axes of an XYZ orthogonal coordinate system may be shown in the drawings. In this case, the normal direction of a main light-emitting surface of a diffuser is defined as a −Y axis direction. The normal direction of the main light-emitting surface of the diffuser may be referred to as a main emission direction of the diffuser and an illuminating direction of an illumination device including the diffuser. Among directions perpendicular to the main emission direction, a direction close to the traveling direction of light entering the diffuser is referred to as a +Z axis direction.

Here, the main light-emitting surface of the diffuser refers to a specifically defined surface, of light exit surfaces that the diffuser has. More specifically, the main light-emitting surface may be, among light exit surfaces through which the diffuser lets out light, in particular, a surface desired to be viewed by a user as a window through which a sky is seen, or more technically, a light-emitting surface simulating a sky.

For example, in a case where the diffuser has a plate shape whose two surfaces are connected by side surfaces, the main light-emitting surface is at least one of the two surfaces connected by the side surfaces. Two or more main light-emitting surfaces may be present. For example, in a case where the diffuser has a plate shape whose two surfaces are connected by side surfaces, the main light-emitting surfaces may be the two surfaces connected by the side surfaces. Hereinafter, in a case where the diffuser has a plate shape, two surfaces connected by side surfaces of the plate shape may be referred to as main surfaces, and surfaces connected to ends of the main surfaces and forming the side surfaces of the plate shape may be referred to as end surfaces or side surfaces.

Alternatively, for example, in a case where the diffuser has a bar shape which is a columnar shape whose two bottom surfaces are connected by side surfaces, the main light-emitting surface may be at least one or a part of the side surfaces of the columnar body. Hereinafter, in a case where the diffuser has a bar shape, the side surfaces (in a case of a hollow body, outer side surfaces) connected by the bottom surfaces of the bar shape may be referred to as main surfaces, and surfaces connected to ends of the main surfaces and forming the bottom surfaces of the bar shape may be referred to as end surfaces or side surfaces.

For example, the main light-emitting surface of the diffuser may be, of the main surfaces, a surface whose normal direction is toward the indoor side when the illumination device including the diffuser is provided instead of a window, or may be a partial area of the surface.

The main light-emitting surface is not limited to a flat surface, and may include a curved surface or a slope surface, for example. The main light-emitting surface may be curved or sloped, or may be a combination of such flat surfaces, curved surfaces, or slope surfaces, for example. In a case where the main light-emitting surface is other than a flat surface, the normal direction of the main light-emitting surface may be the normal direction of a center part or the normal direction of a tangent plane. In such a case where the main light-emitting surface forms the entire outer edge in a YZ cross-section, e.g., a case where the entire side surface of the circular column is the main light-emitting surface, the main light-emitting surface has normal directions radially.

Embodiment 1

Hereinafter, an illumination device according to embodiment 1 of the present disclosure will be described with reference to the drawings.

<Configuration of Illumination Device 200>

FIG. 1 is a sectional view showing a configuration example of the illumination device 200 according to embodiment 1. For example, in a case where the illumination device 200 shown in FIG. 1 is attached to a ceiling surface on the indoor side, a +Y axis direction is toward the ceiling side, and a −Y axis direction is toward the indoor side. A ZX plane in this case may be a plane parallel to the ceiling surface. Alternatively, for example, in a case where the illumination device 200 shown in FIG. 1 is attached to a wall surface on the indoor side, the +Y axis direction is toward the wall surface side, and the −Y axis direction is toward the indoor side. A ZX plane in this case may be a plane parallel to the wall surface.

The illumination device 200 according to embodiment 1 includes a light source 1, a diffuser 100, a turning portion 2, and a sunshine formation portion 3. Further, the illumination device 200 may include a back-surface plate 4 and a light-blocking portion 5. Further, the illumination device 200 includes a retention portion 6 retaining members.

<Diffuser 100>

The diffuser 100 has a light entrance surface 101a and a light exit surface 101b. In the example shown in FIG. 1, the main light-emitting surface is the light exit surface 101*b*. The main light-emitting surface may be a partial area of the surface 101*b*.

Hereinafter, light entering the diffuser 100 may be referred to as light Li. In addition, scattered light produced in the diffuser 100 may be referred to as light Ls. Hereinafter, light guided in the diffuser 100 may be referred to as light Lt or propagation light Lt. Here, that "light is guided" means that light entering the inside of a medium is propagated through a predetermined optical path in the medium. Hereinafter, the light Ls going out from the main light-emitting surface (in the example in FIG. 1, the light exit surface 101*b*; which may be referred to as a first light exit surface) of the diffuser 100 is referred to as first outgoing light or light L1. As described later, light going out from a second light exit surface (in the example in FIG. 1, a light exit surface 101*c*) located on the side opposite to the light entrance surface of the diffuser 100 is referred to as second outgoing light or light L2.

Figure 2:
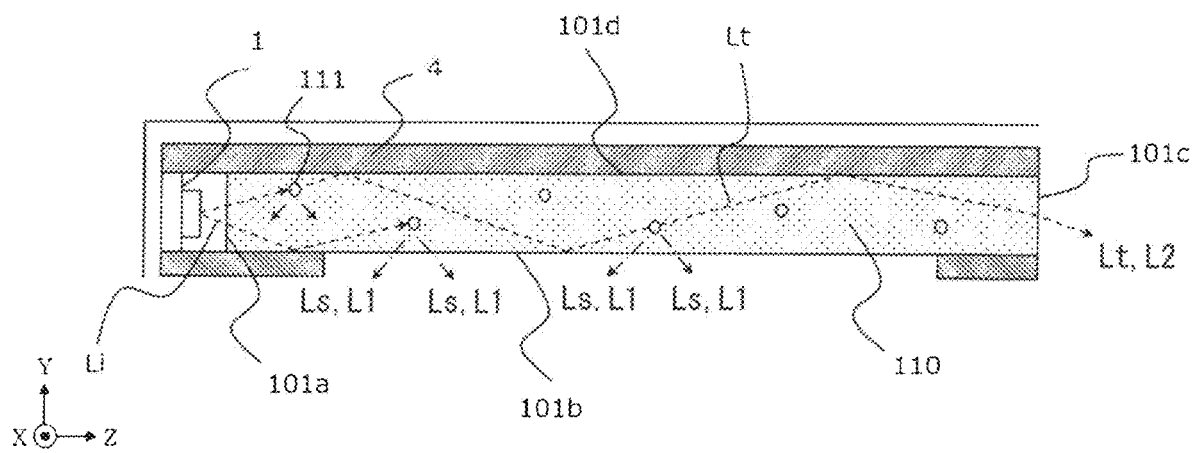
FIG. 2 illustrates an example of an optical path of light in a diffuser.

FIG. 2 illustrates an example of an optical path of light in the diffuser 100. As shown in FIG. 2, the diffuser 100 is configured such that the light Li emitted from the light source 1 enters from the light entrance surface 101*a* which is one of end surfaces and is guided as the light Lt inside the diffuser 100, and a part of the light Lt is scattered to go out as the first outgoing light (L1) from the light exit surface 101*b*.

In the example shown in FIG. 2, the light Li enters in the +Z axis direction from an end side (specifically, the light entrance surface 101*a* corresponding to an end surface of the diffuser 100) of the light exit surface 101*b* which is the main light-emitting surface of the diffuser 100. The light Li is subjected to the scattering effect of the diffuser 100, thus producing the light Ls. The light Ls goes out from the light exit surface 101*b*, so that the diffuser 100 is visually recognized as a light-emitting body that emits natural sky-like light. Hereinafter, the diffuser 100 as the light-emitting body that emits desired light L1 may be referred to as a light-emitting body 100 or a light-emitting panel 100. Hereinafter, a surface at which the main light-emitting surface is formed may be referred to as a front surface, and a surface on the opposite side may be referred to as a back surface.

Light radiated from the light source 1 enters the diffuser 100 from the light entrance surface 101*a* of the diffuser 100 and is guided in the diffuser 100. Then, at least a part of the light guided in the diffuser 100 is scattered to go out from the diffuser 100. More specifically, light guided in the diffuser 100 is scattered in the diffuser 100, to become scattered light, and at least a part of the scattered light goes out as the first outgoing light (light L1) from the light exit surface 101*b*. Here, from the light exit surface 101*b*, at least a part of the light Ls scattered by a scattering structure that the diffuser 100 has goes out.

Among the light that has entered the diffuser 100, the light guided in the diffuser 100, and the light scattered in the diffuser 100, at least a part of light other than the light going out from the light exit surface 101*b* goes out as the second outgoing light from the light exit surface 101*c*. More specifically, among the light that has entered the diffuser 100, the light guided in the diffuser 100, and the light scattered in the diffuser 100, at least a part of light reaching the light exit surface 101*c* located at a position opposite to the light entrance surface 101*a* goes out from the light exit surface 101*c*.

For example, the light Li that has entered from the light entrance surface 101*a* of the diffuser 100 is guided by being reflected by the surface 101*b* (front surface) and a surface 101*d* (back surface). The light Lt is guided by total reflection, for example. A part of the light Lt guided in the diffuser 100 is scattered by the scattering structure that the diffuser 100 has, and goes out as the light L1 from the light exit surface 101*b*. As seen locally, of the light Lt guided in the diffuser 100, a part of light that has not been scattered or light that has been scattered but has not gone out from the light exit surface 101*b* is further transmitted and guided in the diffuser 100. Such light is scattered by another scattering structure that the diffuser 100 has, and goes out as the light L1 from the light exit surface 101*b*, for example. In this way, the light that has entered the diffuser 100 is scattered multiple times by scattering structures. Meanwhile, at least a part of light that does not go out from the light exit surface 101*b* of the diffuser 100 reaches the end surface opposite to the light entrance surface 101*a*.

In this example, the light exit surface 101*c* from which, of the light that has entered the diffuser 100, light that does not go out from the light exit surface 101*b* goes out to the outside is provided at the end surface opposite to the light entrance surface 101*a*. In this example, the light exit surface 101*b* is the first light exit surface, and the light exit surface 101*c* is the second light exit surface. The light going out from the light exit surface 101*c* is oriented by the turning portion 2 described later and goes out as light simulating poured light from the sunshine formation portion 3.

Of the diffuser 100, the first light exit surface (light exit surface 101*b*) is a surface from which the first outgoing light simulating a sky goes out. In addition, the second light exit surface (light exit surface 101*c*) is a surface from which the second outgoing light simulating poured light goes out.

As described above, the illumination device 200 has such a configuration that light enters from an end surface of the diffuser 100 and the first outgoing light simulating a sky goes out from the main surface of the diffuser 100, whereby the device size can be thinned as compared to a configuration in which light enters from the back surface side of the diffuser 100. Further, unlike such a configuration that light simulating direct light of sunlight goes out from a main surface together with scattered light simulating a sky, the illumination device 200 has such a configuration that expresses poured light of sunlight by the sunshine formation portion 3, whereby a natural scene can be reproduced without an observer seeing a pseudo sun through the light-emitting panel. Thus, it is possible to reproduce a natural scene without imposing a limitation on the provision places and the number of provided devices.

An example of the diffuser 100 is a light-guiding panel which is a light-transmitting member for transmitting, reflecting, and guiding light while diffusing (scattering) a part of the light. More specifically, the diffuser 100 has a base material such as transparent resin and a scattering structure for scattering light, for example. Examples of the scattering structure include a projection-recess structure, voids (pores or gaps), and a composition of particles, a crystal, a sol-gel cured oxide, etc., having a refractive index different from that of the base material. A specific configuration of the diffuser 100 is not limited as long as the diffuser 100 is a structure capable of scattering.

The inside of the diffuser 100 may be filled with a refractive material and a scattering structure, for example. Examples of the refractive material include transparent resin, glass, and a silicone material. The material of the diffuser may be any material having a light-transmitting property. In terms of light usage efficiency, it is desirable that the light transmittance of the material of the diffuser is high.

In addition, since the diffuser 100 is located near the light source, it is desirable that the material of the diffuser has high heat-resistance.

The diffuser 100 may include a plurality of kinds of scattering structures. In this case, the average size of the plurality of kinds of scattering structures of the diffuser 100 may be size orders shown below, or the size of one of the plurality of kinds of scattering structures may be size orders shown below. Even in the former case, it is preferable that the size of at least one of the plurality of kinds of scattering structures is size orders shown below.

The diffuser 100 includes a base material 110 and particles 111, for example. The particles 111 are nanoparticles, for example. The "nanoparticles" are particles having a nanometer (nm) order size. In general, nanoparticles are particles having a size of 1 nm to several hundreds of nm. The particles 111 are particles having a nanometer-order particle diameter, for example. As another example, the particles 111 may be micro particles. The "micro particles" are particles having a micrometer (μm) order size. In general, micro particles are particles having a size of 1 μm to several thousands of μm (e.g., 5 mm or less). However, if the size of the particles is too large, presence of the particles in the diffuser 100 becomes conspicuous, so that, for example, a sense of roughness is produced, thus deteriorating visual recognition. Therefore, it is desirable that the size of the particles 111 is not greater than 3000 nm.

The particles 111 may have spherical shapes or other shapes.

The particles 111 are inorganic oxides, for example. Examples of the inorganic oxides include $ZnO$, $TiO_2$, $ZrO_2$, $SiO_2$, and $Al_2O_3$.

The particles 111 scatter the light Li that has entered the diffuser 100, to produce the light Ls. In addition, the particles 111 scatter the light Lt propagated in the diffuser 100, to produce the light Ls.

The base material 110 includes the particles 111. The particles 111 may be added to the base material 110. The particles 111 are dispersed in the base material 110, for example.

The base material 110 is not particularly limited, but may be a transparent material, for example. The base material 110 does not necessarily need to be transparent for all wavelengths of the light Li. As an example, the base material 110 may absorb light having a specific wavelength among the wavelengths of the light Li.

In the base material 110, the transmittance (straight-traveling transmittance) through a light-traveling distance of 5 mm for a design wavelength is preferably not less than 90%, more preferably not less than 95%, and even more preferably not less than 98%. Here, the design wavelength may be a predetermined wavelength among wavelengths of the entering light. The design wavelength is not limited to one wavelength, and may be a plurality of wavelengths or a range of wavelengths (wavelength band). For example, in a case where the entering light is white light, the design wavelength may be one wavelength or two or more wavelengths among 450 nm, 550 nm, and 650 nm. The design wavelengths may be three wavelengths of 450 nm, 550 nm, and 650 nm.

The base material 110 is a solid, for example. The base material 110 may be a resin plate made of a thermoplastic polymer, thermosetting resin, or photopolymerized resin, for example. The resin plate may be made of an acrylic-based polymer, an olefin-based polymer, a vinyl-based polymer, a cellulose-based polymer, an amide-based polymer, a fluorine-based polymer, a urethane-based polymer, a silicone-based polymer, an imide-based polymer, or the like. The diffuser 100 may be formed by dispersing the particles 111 in an uncured material of the base material 110 and then performing curing treatment, for example. The base material 110 is not limited to a solid, and may be a liquid, a liquid crystal, or a gel material.

The diffuser 100 may be made of a porous material made by a sol-gel process, an organic molecule dispersed material, an organic-inorganic hybrid material (may be referred to as an organic-inorganic composite material), or a metal particle dispersed material, for example. As an example, the diffuser 100 may be organic-inorganic hybrid resin, and may be hybrid resin composed of resin and an inorganic oxide, for example. In this case, the diffuser 100 has, as a material corresponding to the particle 111, an inorganic oxide produced by sol-gel curing using, as a base, the base material 110 including an inorganic oxide material and an organic compound. Fine pores or the like produced through such a manufacturing process may be considered to be a scattering structure.

The diffuser 100 may be obtained by forming fine recesses and projections on the surface of the base material 110, for example.

The diffuser 100 may have, at least on one surface, a light-transmitting functional coating such as an antireflection coat, an antifouling coat, a thermal barrier coat, or a water-repellent coat. In consideration of a function (shock resistance, waterproofness, heat resistance, etc.) as a window, the diffuser 100 may have a structure of being interposed between two transparent base materials (e.g., glass plates), for example. In this case, the diffuser 100 may be an intermediate film in laminated glass.

<Example of Scattering Phenomenon>

Hereinafter, a scattering phenomenon in a case where the diffuser 100 has such a structure that scattering particles are dispersed in transparent resin as an example, will be described. The light Li that has entered the diffuser 100 from the light entrance surface 101*a* is guided as the light Lt in the diffuser 100. At least a part of the light Lt guided in the diffuser 100 is scattered by the scattering particles. At this time, the light is scattered with dependency on an angle and a light wavelength. For example, in a case where the size of the scattering particle is sufficiently smaller than the wavelength of hitting light (here, light Lt), the scattered light Ls is produced in an isotropic manner and is less dependent on the scattering angle. In addition, the scattering intensity of light having a relatively short wavelength is greater than the scattering intensity of light having a long wavelength.

On the other hand, in a case where the size of the scattering particle is close to the wavelength of hitting light, the degree of forward scattering of the scattered light Ls is relatively great as compared to backward scattering, and as in the above case, the scattering intensity of light having a relatively short wavelength is greater than light having a relatively long wavelength. As the size of the scattering particle becomes greater relative to the wavelength of light, the degree of forward scattering becomes greater and the wavelength dependency of the scattering intensity becomes smaller.

The scattering intensity by the scattering particle in a case where the wavelength of the light Li is greater than the size of the scattering particle is relatively small as compared to the scattering intensity by the scattering particle in a case where the wavelength of the light Li is smaller than the size of the scattering particle. Therefore, for example, in a case where the light Lt including a wide wavelength spectrum enters the light entrance surface 101*a*, the light Lt having a short wavelength is preferentially scattered as compared to the light Lt having a long wavelength. In this case, the correlated color temperature of light (first outgoing light) going out from the light exit surface 101b of the diffuser 100 is higher than the correlated color temperature of the light Li entering the diffuser 100. Such a color temperature relationship is effective for letting an observer visually recognize the main light-emitting surface of the diffuser 100 from which the first outgoing light goes out, as a window through which a sky is seen naturally. Meanwhile, light (second outgoing light) going out from the light exit surface 101c of the diffuser 100 includes, of the light that has entered the diffuser 100, a part of light (e.g., forward scattered light) scattered in the diffuser 100 other than the first outgoing light, and light that has not been scattered (guided light), and therefore the color temperature of the second outgoing light is lower than the color temperature of the first outgoing light and higher than the correlated color temperature of the light Li entering the diffuser 100. Such a color temperature relationship (in particular, the color temperature relationship between the first outgoing light and the second outgoing light) is effective for letting an observer visually recognize the sunshine formation portion 3 from which the second outgoing light goes out, as a window frame illuminated by poured light of sunlight.

Further, the configuration of the present embodiment can reproduce a more natural sky owing to the angle dependency of the intensity of the first outgoing light. For example, a case where the illumination device 200 of the present embodiment is attached to a ceiling on the indoor side, is considered. It is assumed that the light source 1 is fixed near the light entrance surface 101a and an observer observes the first light exit surface (light exit surface 101b) from below. When the observer observes the first light exit surface, the observer can visually recognize the first light exit surface as a blue sky by the first outgoing light (light L1). As compared to a case of observing the first light exit surface from the directly downward direction which is the normal direction of the first light exit surface, observing the first light exit surface in an oblique direction approaching the traveling direction (+Z axis direction) of the light Li from the normal direction (−Y axis direction) allows the observer to observe a higher luminance. Such luminance change is a phenomenon that occurs also for a natural sky, and when a natural sky is observed, the luminance of the blue sky changes depending on the altitude and the positional relationship with the sun. Thus, the relationship between the light entrance surface 101a and the light exit surface 101b of the diffuser 100 described above can reproduce a more natural sky while achieving a thin size.

The above example is expressed using the angle dependency of the intensity of the first outgoing light, as follows. The outgoing angle of the first outgoing light when the first outgoing light travels in the +Z axis direction is defined as 0 degrees, and the outgoing angle of the first outgoing light when the first outgoing light travels in the normal direction (in the example in FIG. 2, −Y axis direction) of the first light exit surface is defined as 90 degrees. Then, the intensity of the first outgoing light when the outgoing angle is 45 degrees is greater than the intensity of the first outgoing light when the outgoing angle is 90 degrees. For example, the ratio of the intensity of the first outgoing light when the outgoing angle is 45 degrees to the intensity of the first outgoing light when the outgoing angle is 90 degrees is preferably in a range of 1.01 to 10 and more preferably in a range of 1.1 to 5.

In consideration of the angle dependency of the intensity of the first outgoing light as described above, as a preferable configuration example of the diffuser 100, the size of the scattering structure (in a case of a particle, a particle diameter) may be in a range of 10 nm to 3000 nm, or may be more preferably in a range of 50 nm to 2000 nm.

The diffuser 100 may be configured to reproduce a natural sky color appearance (e.g., blue color with transparency) of a blue sky or the like by using Rayleigh scattering or similar scattering of the entering light. The Rayleigh scattering is a scattering phenomenon in which, of light entering onto a scattering particle, light having a short wavelength is preferentially scattered. For example, when light in a visible-light wavelength band (about 350 nm to 850 nm) enters, light in a blue wavelength band is preferentially scattered. Even in this case, when the light source 1 of the illumination device 200 emits visible light, the light L1 going out from the diffuser 100 has a higher correlated color temperature than the correlated color temperature that the light source 1 has. Here, the Rayleigh scattering is a scattering phenomenon that occurs when the size of a particle is smaller than the wavelength of light. That is, in a case of using light in a visible-light wavelength band as light to enter the diffuser 100, it is desirable that the size of the scattering structure of the diffuser 100 (in a case of a particle, a particle diameter) is in a range of 10 nm to 800 nm, in order to obtain preferable scattered light simulating a blue sky.

In a case where change in the angle at which an observer observes the first light exit surface is small, it is preferable that in-plane luminance change in the first light exit surface is small. In this case, the intensity of diffusing in the diffuser 100 may be adjusted by the size, the amount (concentration), or the like of the scattering structure, so that the intensity of the first outgoing light becomes lower than the intensity of the second outgoing light. In addition, as described later, by the diffuser 100 having two or more light entrance surfaces, in-plane luminance change of the first outgoing light in the first light exit surface can be reduced. Such a method can also reproduce a more natural sky while achieving a thin size.

For example, the thickness of the diffuser 100 may be not greater than 100 mm. Further, for example, the thickness of the diffuser 100 may be not greater than 20 mm or may be not greater than 10 mm. Further, for example, the thickness of the diffuser 100 may be not greater than 5 mm. Further, for example, in a case where the size (the length in the Y axis direction) of the light source 1 is small or in a case where the light Li has a small irradiation range on the entrance surface as with light emitted from a laser light source or condensed spot light, the thickness of the diffuser 100 may be not greater than 1 mm.

In a case where it is assumed that the diffuser 100 is an illumination panel simulating a blue sky seen through a window on a sunny day, it is preferable that a bright area 302 can simulate a sunshine area of a window frame on a sunny day and a dark area 301 can simulate a shade area of the window frame on a sunny day. In such a case, it is easily conceivable that the bright area 302, i.e., a pseudo sunshine area, when lit up, is brighter than illumination by the light L1 from the diffuser 100 when lit up, and at the same time, the light L2 going out from the bright area 302 has a lower color temperature than the light L1 going out from the first light exit surface of the diffuser 100. For example, the luminance of a blue sky on a sunny day is about 5000 [cd/m2], and the luminance of a sunshine area on a white diffuse reflection surface used for many window frame members is about 30000 [cd/m2]. In addition, the color temperature of light when a blue sky on a sunny day is observed is about 20000 [K], and the color temperature of light when the sunshine area is observed on the white diffuse reflection surface is about 5000 [K]. Therefore, it is desirable that the magnitude relationship between the luminances of the first light exit surface of the diffuser 100 and the bright area 302 and between the color temperatures of light going out from both areas are kept as described above. However, skies seen through a window are not limited to a blue sky on a sunny day and can include a rainy day or a cloudy day, or both of them. In such a case, the ratio between the luminances of the first light exit surface and the bright area 302 of the diffuser 100 (or between luminous fluxes going out from both areas) is in a range of 20:1 to 1:30.

In addition, for example, the luminance of the first light exit surface of the diffuser 100 when lit up may be 100 [cd/m2] to 6000 [cd/m2] or may be preferably 500 [cd/m2] to 3000 [cd/m2]. On the other hand, the luminance of the bright area 302 when lit up may be 300 [cd/m2] to 30000 [cd/m2] or may be preferably 1000 [cd/m2] to 12000 [cd/m2]. In addition, the correlated color temperature of the light L1 going out from the first light exit surface of the diffuser 100 may be 10000 [K] to 100000 [K] or may be preferably 20000 [K] to 80000 [K]. On the other hand, the correlated color temperature of the light L2 going out from the bright area 302 may be 2000 [K] to 7000 [K] or may be preferably 2500 [K] to 6500 [K].

A difference between the correlated color temperatures of the light L1 going out from the first light exit surface and the light L2 going out from the bright area 302 of the diffuser 100 may be not less than 20000 K and not greater than 98000 K. Further, the ratio of the luminances (or luminous fluxes) of the bright area 302 and the dark area 301 when lit up is desirably in a range of 100:1 to 20:1, and more desirably about 10:1. However, the above relationship is a condition established on a sunny day, and conditions for a cloudy day, a night, and the like are not limited thereto.

<Sunshine Formation Portion 3>

The sunshine formation portion 3 is an optical member provided at least at one position in an area around the diffuser 100, including the front surface side of the diffuser 100. Here, the area around the diffuser 100 is a concept including spaces faced with side surfaces, a space faced with the front surface, and a space faced with the back surface of the diffuser 100. The sunshine formation portion 3 is provided such that a surface thereof on a front side facing the space faced with the first light exit surface is visible from an observer for the illumination device 200, for example. The space faced with the first light exit surface is a space to which the first outgoing light goes out, and hereinafter may be simply referred to as an irradiation space. The sunshine formation portion 3 may be a frame-shaped member simulating a surface (side wall) facing the window side, among surfaces forming the window frame, for example.

For example, the sunshine formation portion 3 may be provided in a predetermined area in front of the diffuser 100 (see FIG. 1). As another example, the sunshine formation portion 3 may be provided in a predetermined area on a lateral side of the diffuser 100 (see FIG. 7 described later).

The sunshine formation portion 3 may be provided so as to surround the irradiation space (the space faced with the light exit surface 101b) of the illumination device 200. For example, the sunshine formation portion 3 may be provided so as to define the outer periphery of the irradiation space, in the area around the diffuser 100. Here, the area around the diffuser 100 may be a space within 500 mm, for example.

The sunshine formation portion 3 may be provided on a front, back, or lateral side of the diffuser 100 with no gap from the diffuser 100. In this case, the diffuser 100 and the sunshine formation portion 3 may be connected with a buffer material therebetween, for example. This can prevent unnecessary light from going out to the irradiation space of the illumination device 200.

The sunshine formation portion 3 has at least a light-transmitting member. Through the sunshine formation portion 3, the second outgoing light (light L2) going out from the second light exit surface (light exit surface 101c) of the diffuser 100 and oriented by the turning portion 2 described later goes out toward the irradiation space (the space faced with the light exit surface 101b). In the example shown in FIG. 1, the sunshine formation portion 3 is formed by a light-transmitting member. The sunshine formation portion 3 may further have a light-transmitting diffusion member. In this case, through the sunshine formation portion 3, the second outgoing light (light L2) going out from the second light exit surface (light exit surface 101c) of the diffuser 100 and oriented by the turning portion 2 described later is diffusively transmitted or diffusively reflected and then goes out toward the irradiation space. For example, the light-transmitting diffusion member is formed by a film material or a sheet material such as a transmission-diffusion sheet, and is provided on a space-side surface of the sunshine formation portion 3. The sunshine formation portion 3 may include scattering particles therein, as the light-transmitting diffusion member. In order to improve light usage efficiency, it is desirable that the transmittance of the sunshine formation portion 3 is high.

<Turning portion 2>

Figure 6:
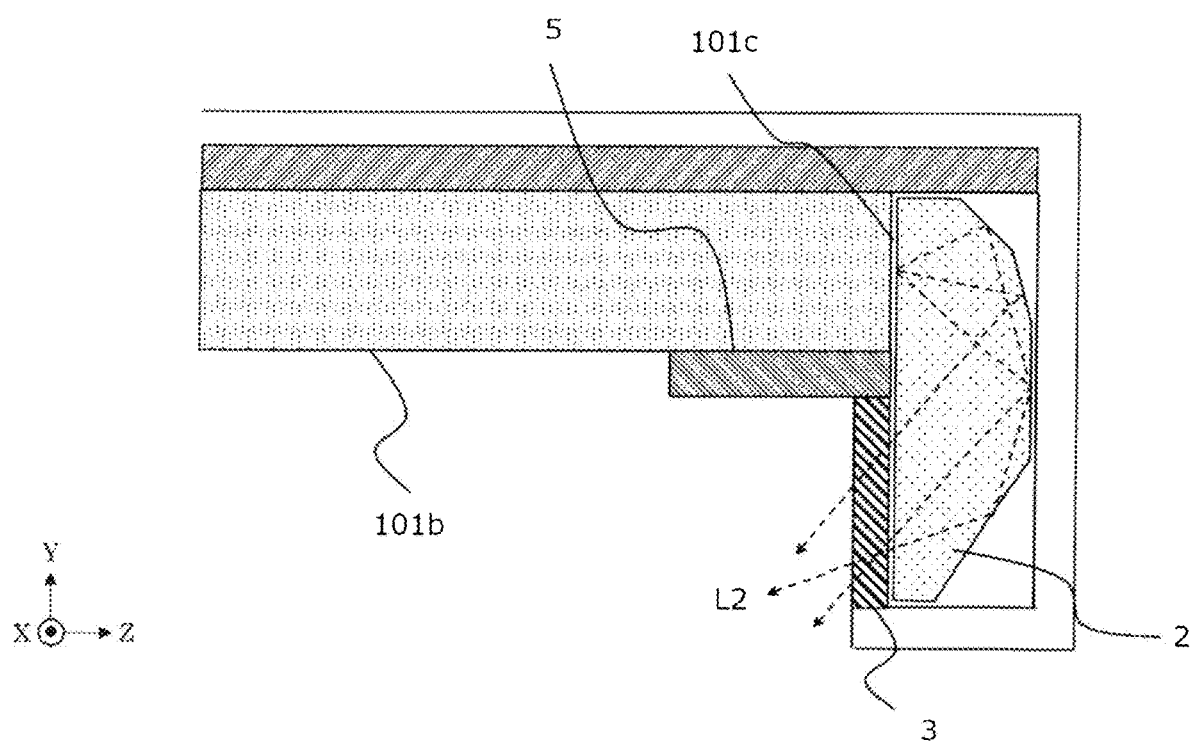
FIG. 6 is a configuration diagram showing another example of the turning portion.

The turning portion 2 is a light-guiding member for orienting the second outgoing light (light L2) going out from the second light exit surface (light exit surface 101c) of the diffuser 100, into light going toward the sunshine formation portion 3. The turning portion 2 has at least one reflection surface. The turning portion 2 may be an optical member having a reflective film or a reflective structure on the surface thereof, for example. For example, the turning portion 2 may be formed by a high-reflectance member such as aluminum, or may be formed by a refractive material which causes internal reflection as shown in FIG. 6 described later.

Figure 3:
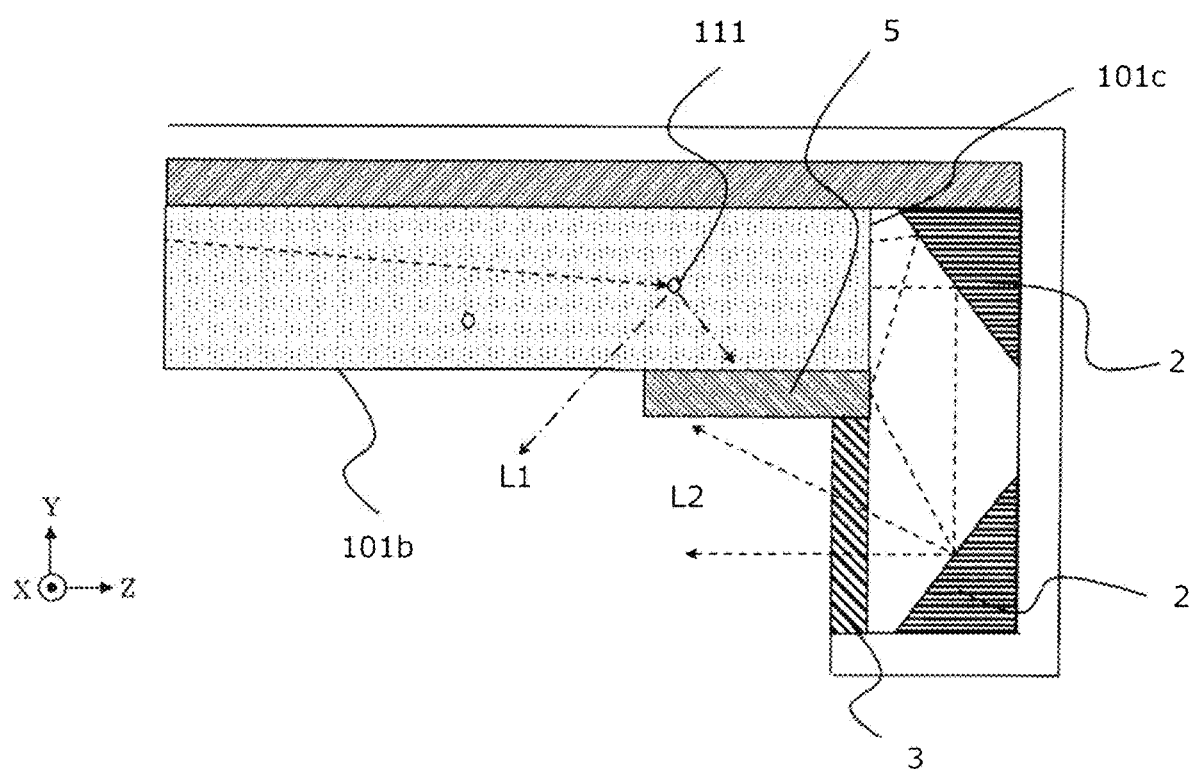
FIG. 3 illustrates an optical path of second outgoing light to a sunshine formation portion.

FIG. 3 illustrates an optical path of the second outgoing light to the sunshine formation portion 3. In the example shown in FIG. 3, the illumination device 200 includes two turning portions 2. Thus, the second outgoing light (light L2) is guided toward the sunshine formation portion 3 by at least one turning portion 2.

The turning portion 2 may guide, toward the sunshine formation portion 3, light such as light going out from a surface other than the second light exit surface of the diffuser 100 or light coming from the light source 1 to the end side of the diffuser 100 where the turning portion 2 is formed not via the diffuser 100, as well as the second outgoing light. For example, in a case where there is a gap between the back surface of the diffuser 100 and the back-surface plate 4 (or the retention portion 6 if the back-surface plate 4 is not provided) described later, the light Li from the light source 1 can pass through the gap and come to the end side where the turning portion 2 is formed, which is the end side opposite to the light entrance surface 101a of the diffuser 100. In such a case, the turning portion 2 may guide, toward the sunshine formation portion 3, the light Li that has come from the light source 1 through the gap to the end side where the turning portion 2 is formed, as well as the second outgoing light.

<Light Source 1>

The light source 1 is provided so as to be opposed to the end surface forming an end of the surface 101*b* where the main light-emitting surface of the diffuser 100 is formed. For example, the light source 1 has a light-emitting surface from which the light Li to enter the diffuser 100 goes out, and the light-emitting surface is located so as to be opposed to the end surface of the diffuser 100. A plurality of light sources 1 may be provided for one diffuser 100. In the present embodiment, a group of light sources or light emitting elements (the number of which may be one) for radiating the entering light Li to one diffuser 100 is collectively referred to as the light source 1.

The light source 1 emits the light Li which is to enter the diffuser 100. The light source 1 emits white light as the light Li, for example. The light source 1 may emit light having a predetermined correlated color temperature Tci as the light Li, for example.

The correlated color temperature Tci is 6500 K, for example. As another example, the correlated color temperature Tci is 5000 K. The correlated color temperatures of light emitted by the light sources may be the same or different from each other.

The color of the light Li emitted from the light source 1 may be a color other than white. For example, the light source 1 may include a white light source and a greenish light source. The light source 1 may include a white light source, a green light source, and an orange light source. The light source 1 may include white light sources having different color temperatures. For example, the light source 1 may include a white light source having a high color temperature and a white light source having a low color temperature.

Here, a color temperature difference between the white color having a high color temperature and the white color having a low color temperature is 8800 K, for example. The correlated color temperature of the white color having a high color temperature is 14400 K, for example. The correlated color temperature of the white color having a high color temperature is not less than 11500 K, for example. The correlated color temperature of the white color having a high color temperature is not greater than 19000 K, for example. The correlated color temperature of the white color having a low color temperature is 5600 K, for example. The correlated color temperature of the white color having a low color temperature is not less than 5500 K, for example. The correlated color temperature of the white color having a low color temperature is not greater than 6050 K, for example.

The configuration examples of the light source 1 and the examples of the color temperature of the light Li emitted from the light source 1 described above are merely examples, and these are adjusted as appropriate together with the configuration of the diffuser 100, so as to obtain desired first outgoing light and second outgoing light.

The light source 1 may be provided so as to be opposed to one end surface of the diffuser 100, or may be provided so as to be opposed to two or more end surfaces of the diffuser 100 (see FIG. 8 described later). In terms of uniform irradiation of the first outgoing light from the first light exit surface, in a case where the main surface of the diffuser 100 has a rectangular shape, the light source 1 is preferably provided so as to be opposed to an end surface connected to a side line in the long-side direction of the main surface of the diffuser 100. In this case, the light entrance surface 101*a* is formed at the end surface connected to the side line in the long-side direction of the main surface of the diffuser 100.

Figure 8:
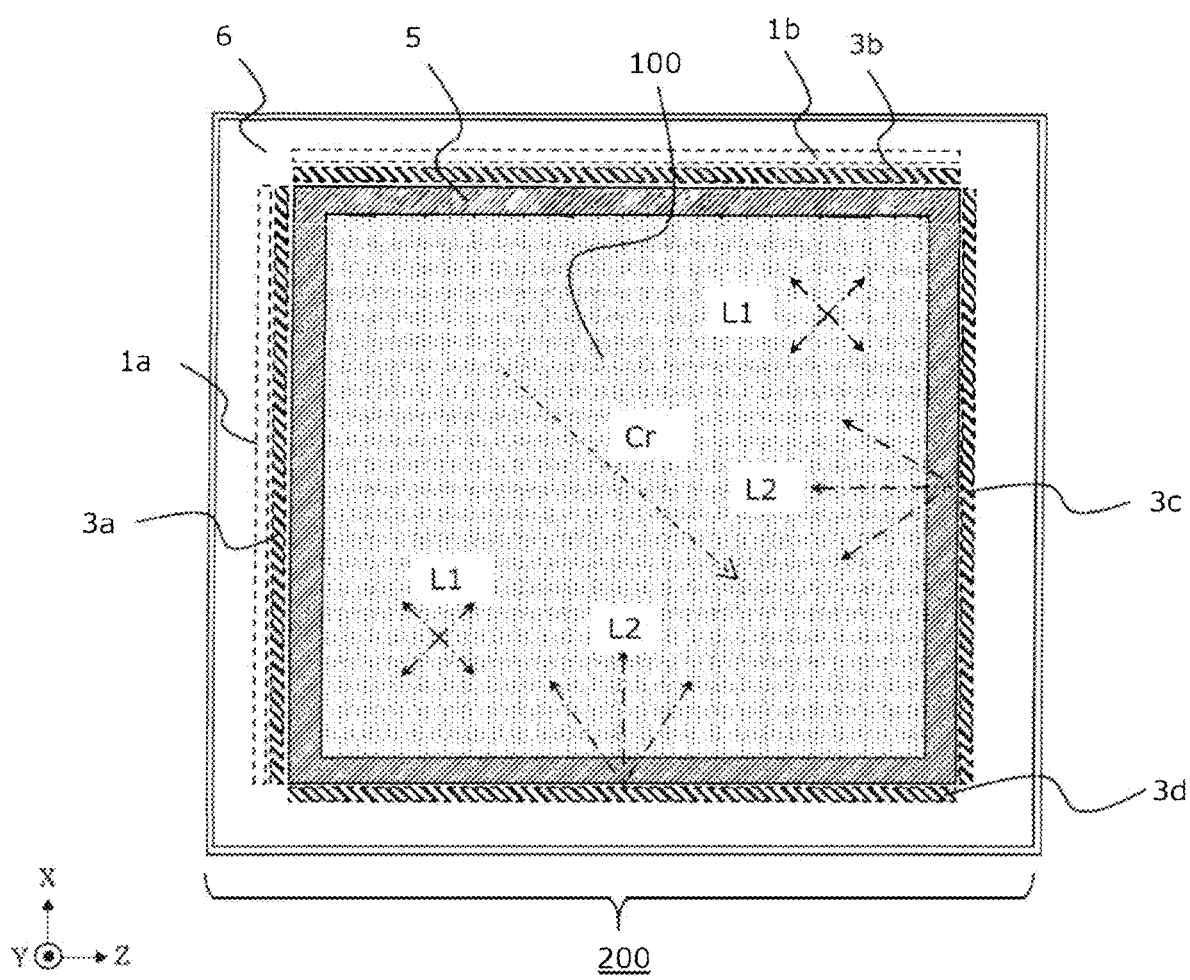
FIG. 8 is a front view showing an example of the illumination device 200.

As shown in FIG. 8, in a case where the light sources 1 are provided so as to be opposed to two or more end surfaces of the diffuser 100, the end surfaces may be end surfaces that are not opposed to each other.

As the light source 1 included in the illumination device 200, a bulb light source such as an incandescent lamp, a halogen lamp, or a fluorescent lamp may be used, for example. Alternatively, as the light source 1, a semiconductor light source such as a light emitting diode (LED) or a laser diode (LD) may be used, for example. That is, the structure, the principle, and the like of the light source 1 are not particularly limited, and any light source may be used. However, in terms of reduction in environmental load such as suppression of discharge of carbon dioxide ($CO_2$) and fuel consumption, it is desirable that the light source 1 is a semiconductor light source. The semiconductor light source is desirable because light emission efficiency is high and size reduction and weight reduction can be easily achieved, as compared to a conventional lamp light source such as a halogen bulb. The semiconductor light source has a high directionality as compared to a conventional lamp light source and thus enables size reduction and weight reduction of an optical system.

As another example, in consideration of zero energy building (ZEB), light guided from outside light (such as sunlight) may be used as substitution for the light Li. For guiding outside light, a light guide body or a daylighting member for receiving outside light and leading the light out in a predetermined direction may be used. In this case, the light source 1 may be a light exit surface of such a light guide body or a daylighting member.

<Back-Surface Plate 4>

As previously described, the illumination device 200 may include the back-surface plate 4. The back-surface plate 4 is provided on the back surface side (in this example, −y axis direction) of the diffuser 100. The back-surface plate 4 may be provided so as to be opposed to the back surface (surface 101*d*) of the diffuser 100. It is preferable that the distance between the back-surface plate 4 and the diffuser 100 is short. The back-surface plate 4 is an example of a light reflection member or a light absorption member provided on the back surface side of the diffuser 100.

The back-surface plate 4 has a reflection function or is opaque, and the transmittance thereof is desirably not greater than 50% and more desirably not greater than 10%.

The back-surface plate 4 is desirably a diffuse reflector and more desirably a white diffuse reflector. The back-surface plate 4 may be a light absorbing body. The back-surface plate 4 may be formed by a high-reflectance metal member such as aluminum, for example. The back-surface plate 4 is not limited to a flat-plate shape. The back-surface plate 4 may be curved or sloped, or may have a combination of such flat surfaces, curved surfaces, or slope surfaces, for example. The back-surface plate 4 may be formed by a film material or a sheet material such as a reflective sheet, for example. In this case, the back-surface plate 4 may have a specular reflection effect or a diffuse reflection effect (a reflection effect such as Lambertian reflection or Gaussian reflection).

The open/close state of the back-surface plate 4 may be changeable. In a case where the back-surface plate 4 is formed to be openable and closable, when a user wants to view the space on the back surface side or wants to take in outside light, the user can open the back-surface plate 4 to view the space on the back surface or take in outside light via the diffuser 100, or a user can use the illumination device 200 as a window. The open/close state of the back-surface plate 4 may be changeable by the back-surface plate 4 being folded or stored into a door pocket as with a blind or a shutter, for example.

The shutter state of the back-surface plate 4 may be changeable by voltage application to the back-surface plate 4 as with a liquid crystal shutter, for example. The shutter state of the back-surface plate 4 may be changeable by voltage application to the back-surface plate 4 as with a liquid crystal panel, for example.

The back-surface plate 4 may be supported integrally with the diffuser 100, in the retention portion 6. In this case, the back-surface plate 4 may be supported so as to be openable and closable integrally with the diffuser 100.

The back-surface plate 4 reflects, of light that has entered the diffuser 100, light going out from the surface 101d (back surface) due to a transmission, guiding, or scattering effect, toward the −Y axis direction, for example. The light reflected by the back-surface plate 4 can be converted to the light L1 or the light L2 due to a transmission, guiding, or scattering effect of the diffuser 100, whereby light usage efficiency of the entire illumination device can be improved.

In a case where the illumination device 200 is used also as a window, light going out to the back surface side might result in light pollution to people present on the back surface side, e.g., in an outdoor area. In such a case, the back-surface plate 4 can reduce light leakage to the back surface side.

<Light-Blocking Portion 5>

As previously described, the illumination device 200 may include the light-blocking portion 5. The light-blocking portion 5 is formed by a reflective material or a light absorption material. The light-blocking portion 5 is provided for inhibiting the first outgoing light (light L1) from entering the sunshine formation portion 3 via the irradiation space. In addition, the light-blocking portion 5 is provided for inhibiting the second outgoing light (light L2) from entering the diffuser 100 via a space (which is a concept including the irradiation space) faced with the sunshine formation portion 3.

The light-blocking portion 5 is provided at least at one position between the diffuser 100 (in particular, the first light exit surface) and the sunshine formation portion 3, for example. It is preferable that, at least at one position on an optical path through which the first outgoing light (light L1) would reach the sunshine formation portion 3 if the first outgoing light goes out over the entire range where the first outgoing light can go out without provision of the light-blocking portion 5, the light-blocking portion 5 is provided so as to interrupt the optical path. In addition, it is preferable that, at least at one position on an optical path through which the second outgoing light (light L2) would reach the first light exit surface of the diffuser 100 if the second outgoing light goes out over the entire range where the second outgoing light can go out without provision of the light-blocking portion 5, the light-blocking portion 5 is provided so as to interrupt the optical path. In FIG. 1, the light-blocking portion 5 is provided on the main surface of the diffuser 100, as an example.

With such a light-blocking portion 5 provided, the illumination function of the first outgoing light going out from the first light exit surface and the illumination function of the second outgoing light going out from the sunshine formation portion 3 are separated from each other, whereby unnecessary light can be inhibited from being reflected on the diffuser 100 and the sunshine formation portion 3.

Modifications

Figure 4:
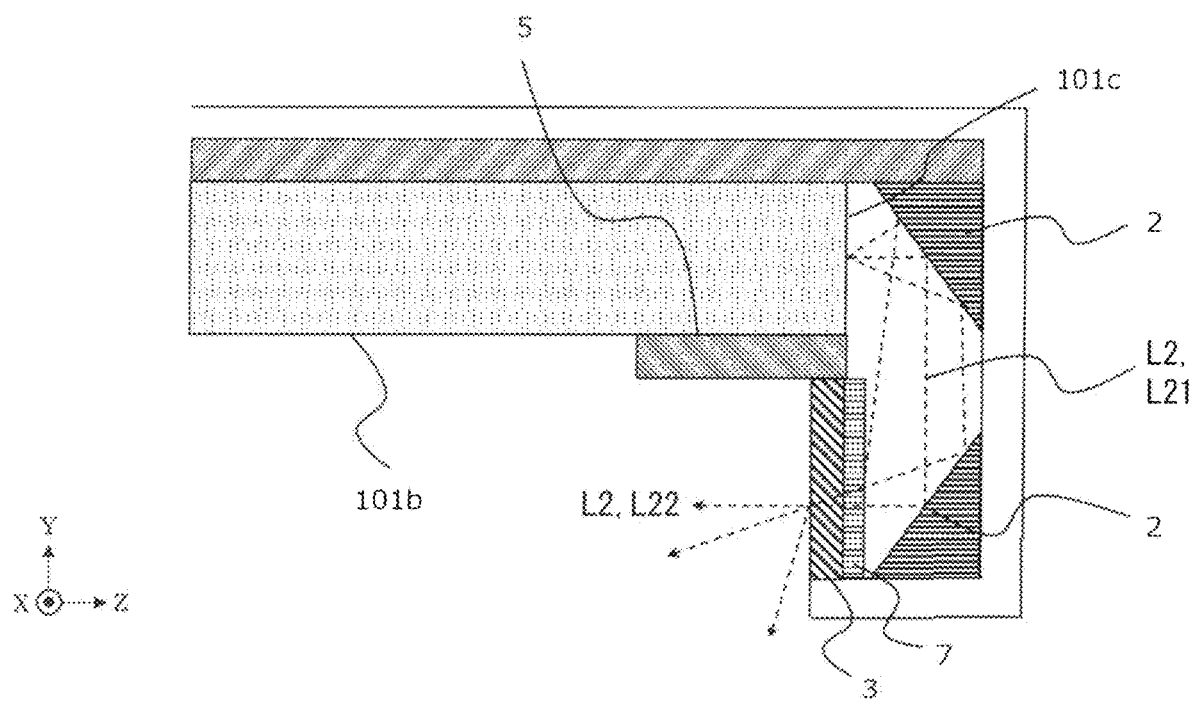
FIG. 4 is a configuration diagram showing another example of the illumination device 200.

FIG. 4 is a configuration diagram showing another example of the illumination device 200 according to embodiment 1. As shown in FIG. 4, the illumination device 200 may further include a color conversion member 7. The color conversion member 7 converts the second outgoing light (light L2) going out from the diffuser 100, in order to let out light having a preferable color temperature from the sunshine formation portion 3. Specifically, the color conversion member 7 converts the second outgoing light going out from the diffuser 100, to light having a lower correlated color temperature than the correlated color temperature of the second outgoing light. Hereinafter, the second outgoing light before conversion by the color conversion member 7 may be referred to as light L21, and the second outgoing light before conversion by the color conversion member 7 may be referred to as light L22. Here, the color temperature of the light L22 is lower than the color temperature of the light L21. The color conversion member 7 is a color filter, or transparent resin or a sheet in which a phosphor element is sealed, for example. It is desirable that the color conversion member 7 has a high transmittance, in order to improve light usage efficiency.

The color conversion member 7 is provided on an optical path of the second outgoing light from the second light exit surface (light exit surface 101c) of the diffuser 100 to the sunshine formation portion 3, for example. In FIG. 4, the color conversion member 7 is placed in contact with the back surface of the sunshine formation portion 3, as an example. Placement of the color conversion member 7 is not limited thereto. The color conversion member 7 may be placed in contact with the second light exit surface, for example, and in this case, the color conversion member 7 may be formed integrally with the diffuser 100.

Figure 5:
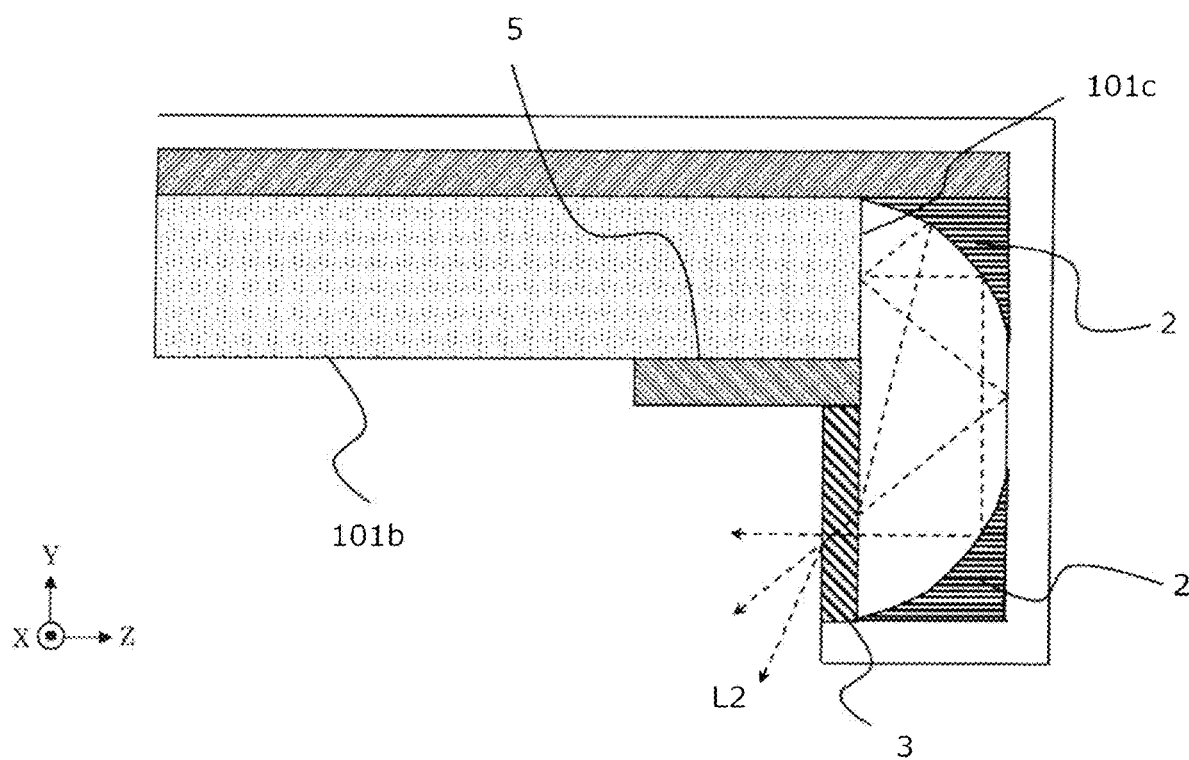
FIG. 5 is a configuration diagram showing another example of a turning portion.

FIG. 5 and FIG. 6 are configuration diagrams showing other examples of the turning portion 2. In the above examples, the reflection surface of the turning portion 2 is a flat surface. However, the reflection surface of the turning portion 2 is not limited to a flat-surface shape, and may be a curved-surface shape, for example. Alternatively, as shown in FIG. 6, the turning portion 2 may be a light-guiding member made of a refractive material. In this case, the second outgoing light is guided inside the light-guiding member so as to be led to the sunshine formation portion 3 through internal reflection by the light-guiding member. The light-guiding member may have a polyhedron shape, for example. The light-guiding member may be formed by transparent resin having a high transmittance, for example.

Figure 7:
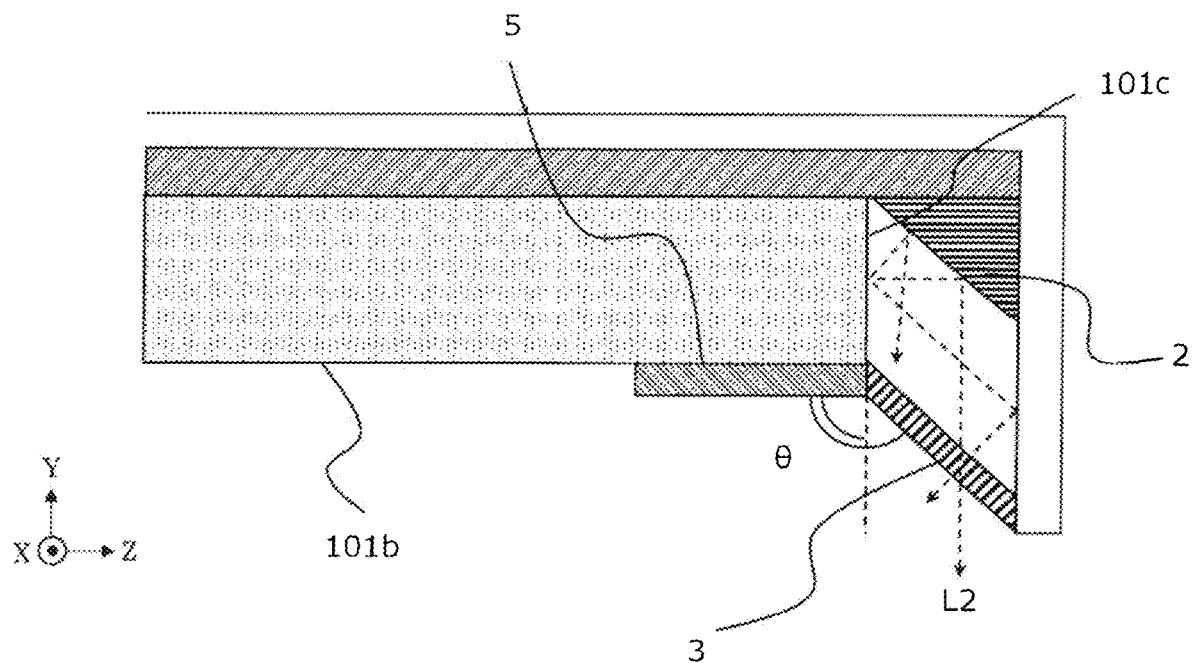
FIG. 7 is a configuration diagram showing another example of a sunshine formation portion.

FIG. 7 is a configuration diagram showing another example of the sunshine formation portion 3. In the above examples, the sunshine formation portion 3 is placed perpendicularly (90 degrees) to the first light exit surface (light exit surface 101b) of the diffuser 100. However, the sunshine formation portion 3 may be placed so as to be sloped relative to the first light exit surface. In this case, it is desirable that a slope angle θ of the sunshine formation portion 3 is 90 degrees to 150 degrees with respect to an angle that the first light exit surface has on a YZ plane. Here, θ may be an angle of the front surface (the surface on the irradiation space side) of the sunshine formation portion 3 with respect to the first light exit surface.

This is for using the second outgoing light going out from the sunshine formation portion 3 as illumination light, in a case where the illumination device 200 is attached to a ceiling or a wall surface. Further, this is for reproducing a more natural scene by simulating a state in which the sunshine formation portion 3 is illuminated by sunlight poured from a window.

Figure 9:
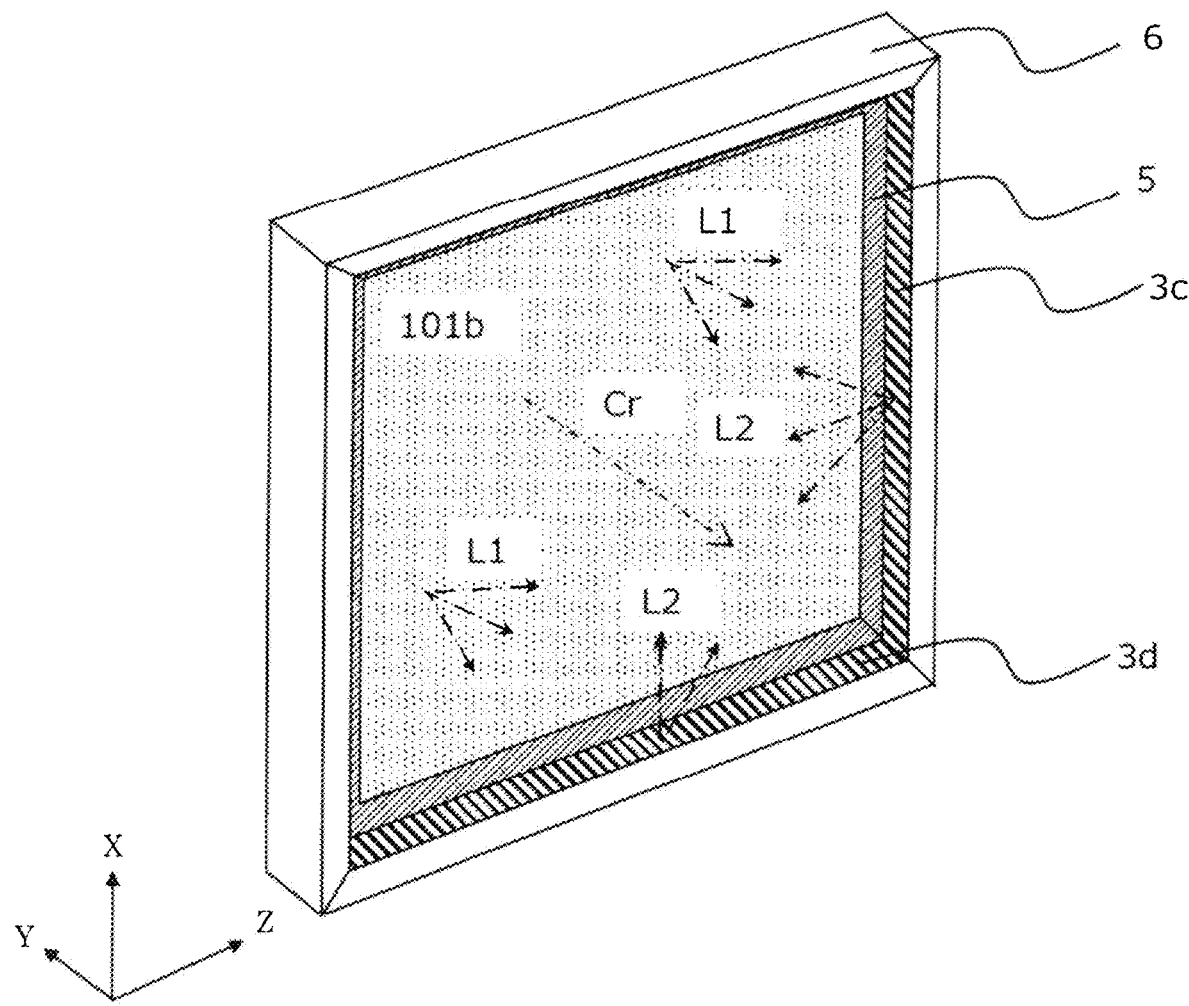
FIG. 9 is a perspective view showing the example of the illumination device 200.

FIG. 8 is a front view showing an example of the illumination device 200 according to embodiment 1, and FIG. 9 is a perspective view of the illumination device 200 shown in FIG. 8. As shown in FIG. 8, for example, the illumination device 200 may include one or more light sources at a plurality of side lines of the main light-emitting surface of the diffuser 100. In FIG. 8, among four side lines (side lines a to d) of the main light-emitting surface of the diffuser 100, light sources are provided at two side lines (side line a and side line b) that are not opposed to each other, as an example. The sunshine formation portions 3 are provided at the peripheries of ends respectively corresponding to the four side lines. In FIG. 8, the light source 1 provided on the side-line-a side is shown as a light source 1a, and the light source 1 provided on the side-line-b side is shown as a light source 1a. In FIG. 8, the sunshine formation portion 3 provided at the periphery of the side-line-a side end is shown as a sunshine formation portion 3a, the sunshine formation portion 3 provided at the periphery of the side-line-b side end is shown as a sunshine formation portion 3b, the sunshine formation portion 3 provided at the periphery of the side-line-c side end is shown as a sunshine formation portion 3c, and the sunshine formation portion 3 provided at the periphery of the side-line-d side end is shown as a sunshine formation portion 3d. Here, the side line a and the side line c are opposed to each other, and the side line b and the side line d are opposed to each other.

In this example, light emitted from the light source 1a enters from the light entrance surface provided at the side-line-a side end of the diffuser 100. Then, a part of the light that has entered into the diffuser 100 goes out as the second outgoing light (light L2) from the second light exit surface provided at the opposed side-line-c side end, and passes through the turning portion 2, to go out from the sunshine formation portion 3c. In addition, light emitted from the light source 1b enters from the light entrance surface provided at the side-line-b side end of the diffuser 100. Then, a part of the light that has entered into the diffuser 100 goes out as the second outgoing light from the second light exit surface provided at the opposed side-line-d side end, and passes through the turning portion 2, to go out from the sunshine formation portion 3d. That is, among the sunshine formation portions 3a, 3b, 3c, 3d, the second outgoing light goes out from the sunshine formation portion 3c and the sunshine formation portion 3d, so that the sunshine formation portion 3c and the sunshine formation portion 3d light up. Thus, it is possible to simulate a scene in which the sunshine formation portion 3c and the sunshine formation portion 3d are illuminated with sunlight.

At this time, the second outgoing light goes out toward a −Z direction from the sunshine formation portion 3c, and the second outgoing light goes out toward a +X axis direction from the sunshine formation portion 3d. In this example, the illumination device 200 can simulate a scene in which sunlight Cr is poured at an angle shown in the drawings. The sunlight Cr simulated in the drawings appears being poured toward a −X axis direction, the −Y axis direction, and the +Z axis direction.

The second outgoing light going out toward the −Z direction from the sunshine formation portion 3c may be configured to slightly illuminate the surface of the sunshine formation portion 3a provided on the opposed side-line-a side. Similarly, the second outgoing light going out toward the X direction from the sunshine formation portion 3d may be configured to slightly illuminate the surface of the sunshine formation portion 3b provided on the opposed side-line-b side. A phenomenon in which poured light illuminating the window frame is reflected to illuminate an opposed surface can actually occur in the daytime when sunlight is strong. The above configuration can reproduce a more natural scene.

In this example, the first outgoing light (light L1) goes out in an isotropic manner toward the −Y axis direction from the first light exit surface.

Figure 10:
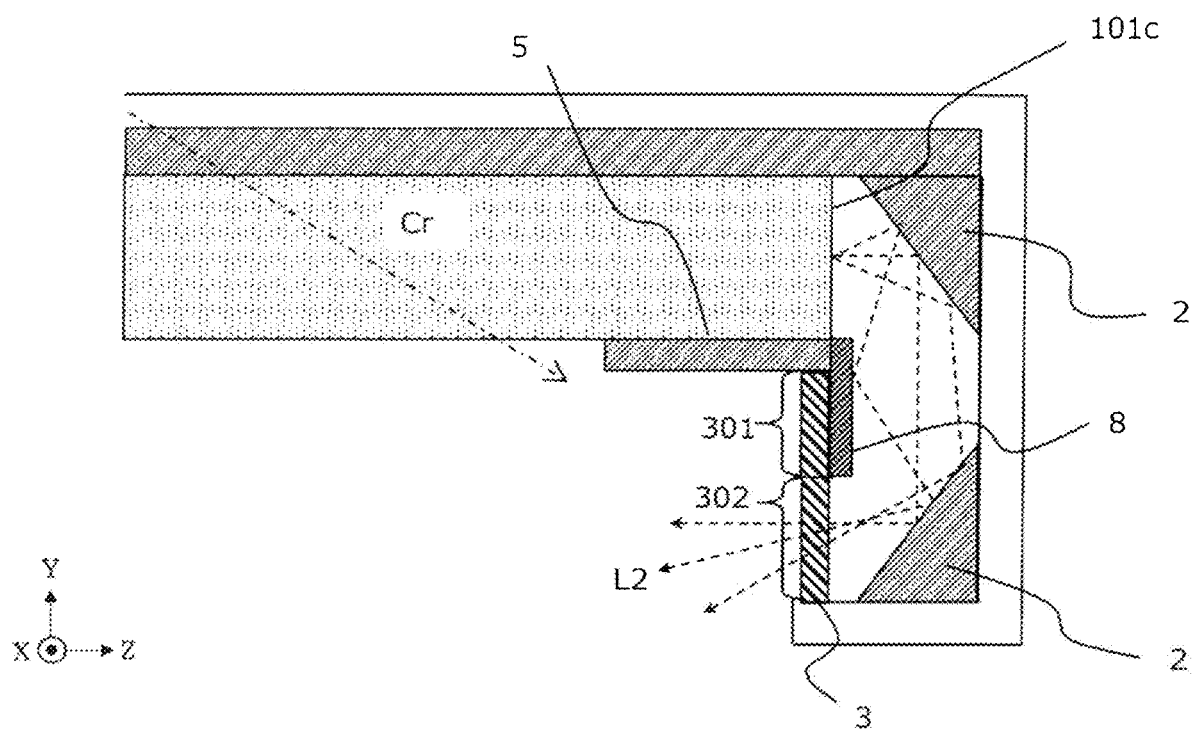
FIG. 10 is a sectional view showing another example of the illumination device 200.
Figure 11A:
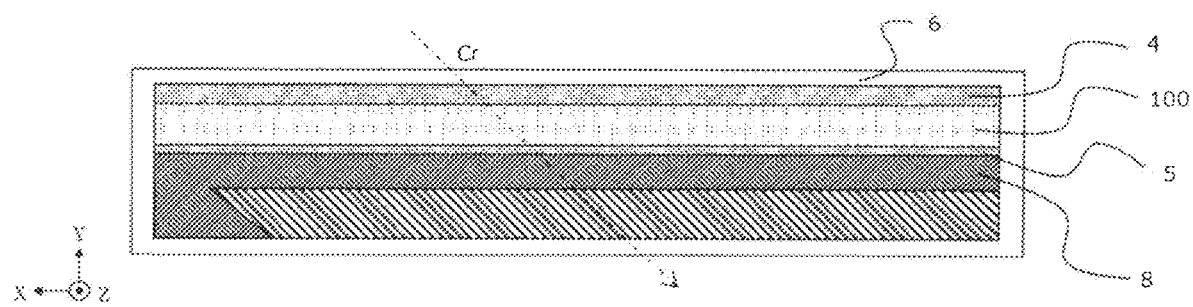
FIGS. 11A and 11B are sectional views showing the example of the illumination device 200.
Figure 11B:
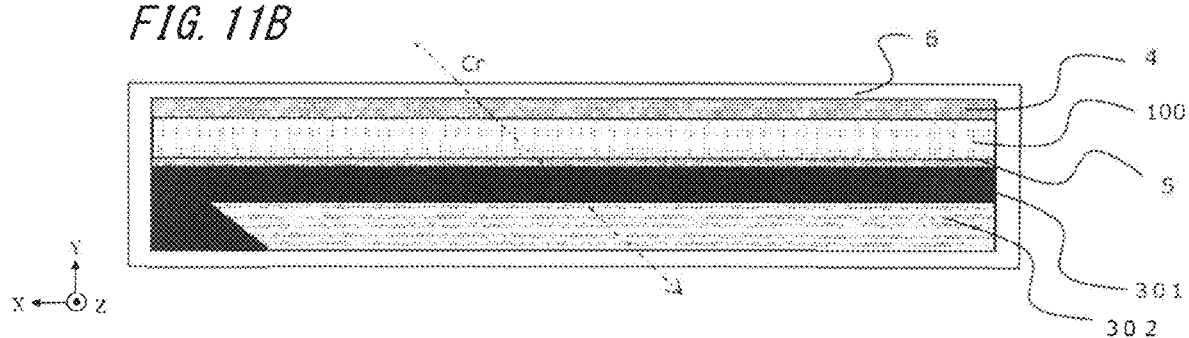
Figure 12:
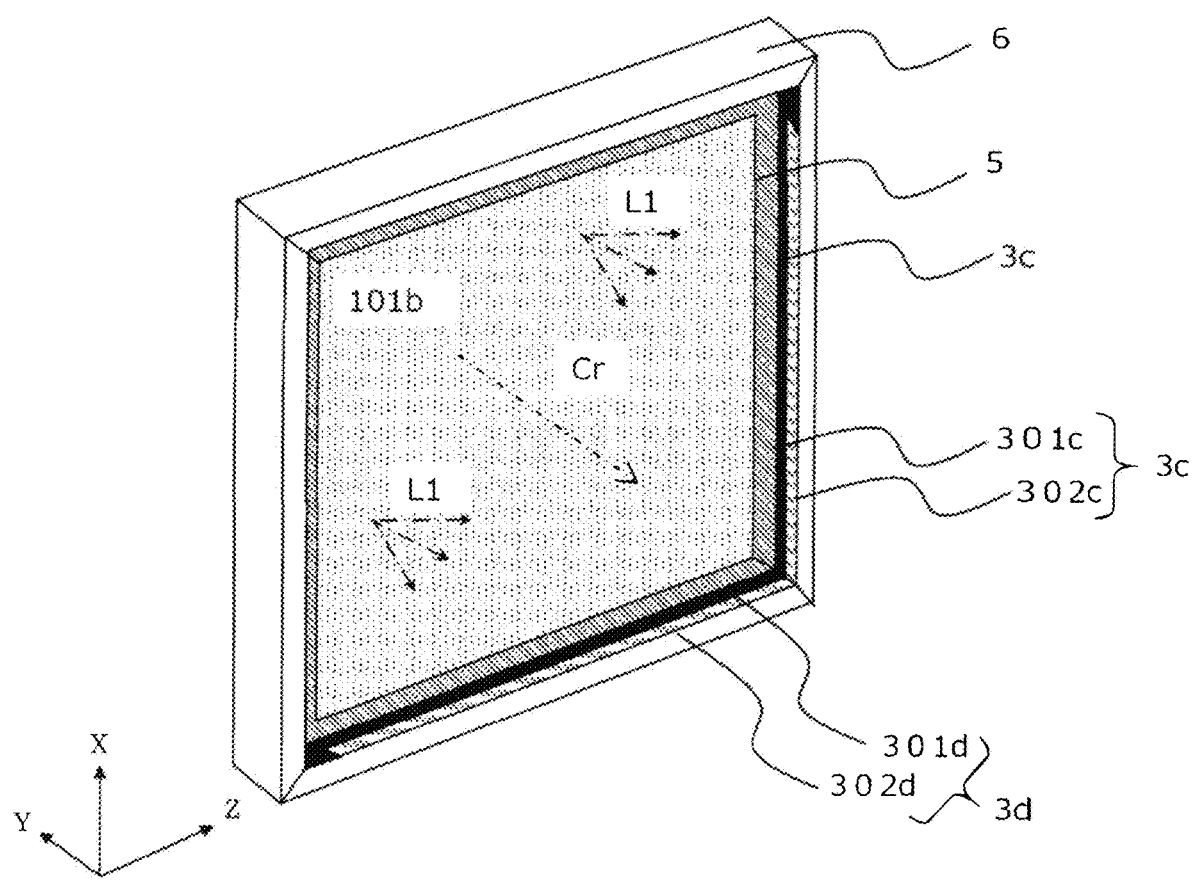
FIG. 12 is a perspective view showing the example of the illumination device 200.

FIG. 10 is a sectional view showing another example of the illumination device 200 according to embodiment 1. FIGS. 11A and 11B show sectional views of the illumination device 200 shown in FIG. 10, as seen from the +Z axis direction. FIG. 11A is a sectional view showing a physical configuration example of the illumination device 200 shown in FIG. 10, and FIG. 11B is a sectional view showing a functional configuration example of the illumination device 200 shown in FIG. 10. FIG. 12 is a perspective view showing an example of the illumination device 200 shown in FIG. 10, as seen from an observer.

As shown in FIG. 10 and FIG. 11A, the illumination device 200 may further include a light amount adjustment portion 8. In this example, the sunshine formation portion 3 includes the dark area 301 and the bright area 302. Here, the dark area 301 is an area for simulating a shade formed on the sunshine formation portion 3 by poured light from the sun. The bright area 302 is an area for simulating sunshine formed on the sunshine formation portion 3 by the poured light.

The light amount adjustment portion 8 may be a light limiting member for weakening, of light entering the sunshine formation portion 3, the intensity of light going from the dark area 301 toward the irradiation space (the space faced with the light exit surface 101b) of the illumination device 200, as compared to the intensity of light going from the bright area 302 toward the irradiation space. The light limiting member is also called a mask. The light amount adjustment portion 8 is placed in at least an area corresponding to the dark area 301 on an optical path until light entering the sunshine formation portion 3 goes into the front surface (the surface on the irradiation space side) of the sunshine formation portion 3 or the back surface on the back side thereof and then goes out as light heading toward the irradiation space from the front surface of the sunshine formation portion 3. Here, the above optical path includes not only an optical path from the diffuser 100 to the sunshine formation portion 3 but also an optical path from a first sunshine formation portion 3 to a second sunshine formation portion 3 opposite thereto across the irradiation space, an optical path in the sunshine formation portion 3, and a surface of the sunshine formation portion 3.

In addition, the area corresponding to the dark area 301 on the optical path as described above refers to such an area that, at any position (a position in the traveling direction of light) on the optical path as described above, when light traveling on the optical path passes through the area, the light becomes light heading toward the irradiation space from the dark area 301 on the sunshine formation portion 3. Similarly, the area corresponding to the bright area 302 on the optical path as described above refers to such an area that, at any position (a position in the traveling direction of light) on the optical path as described above, when light traveling on the optical path passes through the area, the light becomes light heading toward the irradiation space from the bright area 302 on the sunshine formation portion 3.

The light amount adjustment portion 8 has a light blocking function of preventing a part of the second outgoing light (light L2) from reaching the sunshine formation portion 3, for example. The light amount adjustment portion 8 may be an optical member that absorbs or reflects at least a part of entering light. It is preferable that the light amount adjustment portion 8 is formed by a member having a high reflectance, in order to improve light usage efficiency.

Providing the light amount adjustment portion 8 as described above allows an observer to recognize the dark area 301 formed on at least one sunshine formation portion 3, as a darker area than the bright area 302 formed on the sunshine formation portion 3 or another sunshine formation portion 3.

In the example shown in FIG. 10 and FIG. 11A, the light amount adjustment portion 8 is placed in contact with the back surface of the sunshine formation portion 3. In this example, the dark area 301 formed on the sunshine formation portion 3 has a shape equivalent to the light amount adjustment portion 8 (see FIG. 11B).

FIG. 12 is a perspective view showing an example of the illumination device 200 as seen from an observer in a case where light sources are provided at adjacent two side lines (side line a and side line c) of the diffuser 100, as in the example shown in FIG. 8. In this example, the sunshine formation portion 3c and the sunshine formation portion 3d are each divided into the dark area 301 and the bright area 302 regarding the illumination states. That is, the sunshine formation portion 3c is divided into a dark area 301c and a bright area 302c regarding the illumination states, and the sunshine formation portion 3d is divided into a dark area 301d and a bright area 302d regarding the illumination states. It is preferable that the shapes of the dark area 301c, the bright area 302c, the dark area 301d, and the bright area 302d express the state of the window frame when the simulated sunlight Cr is blocked by the light-blocking portion 5 and the retention portion 6 (see also FIG. 10).

The light amount adjustment portion 8 provided as described above is coordinated with the sky simulating function of the diffuser, whereby a more natural skylight window or wall window can be reproduced.

As described above, according to the above embodiment and modifications thereof, it is possible to achieve size reduction and structure simplification by sharing a common light source as a light source for simulating a sky seen through a window and a light source for simulating poured light illuminating a window frame, and reproduce a natural scene without imposing a limitation on the provision places and the number of provided devices.

DESCRIPTION OF THE REFERENCE CHARACTERS 200 illumination device
100 diffuser
101a light entrance surface
101b light exit surface (first light exit surface)
101c light exit surface (second light exit surface)
101d back surface
110 base material
111 particle
1, 1a, 1b light source
2 turning portion
3, 3a, 3b, 3c, 3d sunshine formation portion
301 dark area
302 bright area
4 back-surface plate
5 light-blocking portion
6 retention portion
7 color conversion member
8 light amount adjustment portion

The invention claimed is:

1. An illumination device comprising:
a light source;
a diffuser having a scattering structure to scatter light that has entered the diffuser, and having at least one light entrance surface, a first light exit surface from which first outgoing light including scattered light produced by the scattering structure goes out, and a second light exit surface from which second outgoing light different from the first outgoing light goes out, and receiving incoming light from the light source and producing the first and second outgoing light;
a sunshine formation portion provided at least at one position around the diffuser, having a light-transmitting member, and performing by using the second outgoing light;
a turning portion to guide the second outgoing light toward the sunshine formation portion;
a light-blocking portion provided at least at one position between the first light exit surface and the sunshine formation portion, wherein
the first outgoing light goes out from the first light exit surface to a space faced with the first light exit surface,
at least a part of the second outgoing light is oriented by the turning portion, to go out from the sunshine formation portion toward the space, and
the light-blocking portion is provided for inhibiting the first outgoing light from entering the sunshine formation portion via the space, and for inhibiting the second outgoing light from entering the diffuser.

2. The illumination device according to claim 1, wherein the second outgoing light includes, of the light that has entered the diffuser, light that has not been scattered by the scattering structure, and
a correlated color temperature of the first outgoing light is higher than a correlated color temperature of the second outgoing light.

3. The illumination device according to claim 1, wherein an intensity of the first outgoing light is lower than an intensity of the second outgoing light.

4. The illumination device according to claim 1, wherein the light entrance surface is located at a first end of the first light exit surface, and
the second light exit surface is located at a second end, opposite to the first end, of the first light exit surface.

5. The illumination device according to claim 1, wherein the first light exit surface has a rectangular shape or a square shape.

6. The illumination device according to claim 1, wherein the light source and the sunshine formation portion are located at positions opposite to each other across the diffuser.

7. The illumination device according to claim 1, further comprising a color conversion member provided on an optical path of the second outgoing light from the second light exit surface to the sunshine formation portion.

8. The illumination device according to claim 1, wherein a size of the scattering structure is in a range of 10 nm to 3000 nm.

9. The illumination device according to claim 1, wherein
an angle of a front surface of the sunshine formation portion with respect to the first light exit surface is in a range of 90 degrees to 150 degrees.

10. The illumination device according to claim 1, wherein
the first light exit surface simulates a sky seen through a window by the first outgoing light going out from the first light exit surface, and
the sunshine formation portion simulates poured light illuminating a window frame by the second outgoing light going out from the sunshine formation portion.

11. The illumination device according to claim 1, wherein
the diffuser has two or more light entrance surfaces, and
a plurality of the first light exit surfaces, a plurality of the second light exit surfaces, a plurality of the turning portions, and a plurality of the sunshine formation portions are provided correspondingly to the two or more light entrance surfaces, respectively.

12. The illumination device according to claim 1, wherein
the sunshine formation portion includes a dark area and a bright area,
the illumination device further comprising a light amount adjustment portion to weaken, of light entering the sunshine formation portion, an intensity of light heading toward an irradiation space of the illumination device from the dark area, as compared to an intensity of light heading toward the irradiation space from the bright area.

13. An illumination device comprising:
a light source;
a diffuser having a scattering structure to scatter light that has entered the diffuser, and having at least one light entrance surface, a first light exit surface from which first outgoing light including scattered light produced by the scattering structure goes out, and a second light exit surface from which second outgoing light different from the first outgoing light goes out;
a sunshine formation portion provided at least at one position around the diffuser, and having a light-transmitting member; and
a turning portion to guide the second outgoing light toward the sunshine formation portion,
wherein
the sunshine formation portion includes a dark area and a bright area,
the illumination device further comprising a light amount adjustment portion to weaken, of light entering the sunshine formation portion, an intensity of light heading toward an irradiation space of the illumination device from the dark area, as compared to an intensity of light heading toward the irradiation space from the bright area.

14. The illumination device according to claim 13, wherein
the second outgoing light includes, of the light that has entered the diffuser, light that has not been scattered by the scattering structure, and
a correlated color temperature of the first outgoing light is higher than a correlated color temperature of the second outgoing light.

15. The illumination device according to claim 13, wherein
an intensity of the first outgoing light is lower than an intensity of the second outgoing light.

16. The illumination device according to claim 13, wherein
the light entrance surface is located at a first end of the first light exit surface, and
the second light exit surface is located at a second end, opposite to the first end, of the first light exit surface.

17. The illumination device according to claim 13, wherein
the first light exit surface has a rectangular shape or a square shape.

18. The illumination device according to claim 13, wherein
the light source and the sunshine formation portion are located at positions opposite to each other across the diffuser.

19. The illumination device according to claim 13, further comprising a light-blocking portion provided at least at one position between the first light exit surface and the sunshine formation portion.

20. The illumination device according to claim 13, further comprising a color conversion member provided on an optical path of the second outgoing light from the second light exit surface to the sunshine formation portion.

* * * * *